United States Patent [19]

Hall

[11] 3,999,912
[45] Dec. 28, 1976

[54] MEANS FOR MOLDING FIBER REINFORCED COMPOSITE TUBE

[75] Inventor: Judge H. Hall, Anaheim, Calif.

[73] Assignee: TRW Inc., Redondo Beach, Calif.

[22] Filed: Oct. 22, 1975

[21] Appl. No.: 624,807

Related U.S. Application Data

[62] Division of Ser. No. 583,346, June 2, 1975, Pat. No. 3,962,394.

[52] U.S. Cl. .................................. 425/84; 425/389; 425/393; 425/403
[51] Int. Cl.² .......................................... B29B 1/26
[58] Field of Search ............. 425/403, 389, 393, 84

[56] References Cited

UNITED STATES PATENTS

| | | | |
|---|---|---|---|
| 2,678,677 | 5/1954 | Hervey et al. | 425/389 X |
| 3,344,007 | 9/1967 | Skoggard | 264/314 X |
| 3,377,657 | 4/1968 | Richardson et al. | 249/112 X |
| 3,579,400 | 5/1971 | Kanyok et al. | 264/269 X |
| 3,809,513 | 5/1974 | Sellers et al. | 425/84 |

*Primary Examiner*—Richard B. Lazarus
*Attorney, Agent, or Firm*—Daniel T. Anderson; Donald R. Nyhagen; Jerry A. Dinardo

[57] ABSTRACT

A fiber reinforced composite tube is molded by applying an annular, liquid-resin-impregnated layer of reinforcing fibers to a cylindrical mold or mandrel; placing in contact with the exposed surface of the fiber-resin layer a compression sleeve which is split lengthwise to permit circumferential contraction or expansion of the sleeve into pressurizing relation with the layer; pressurizing the compression sleeve with fluid pressure to compress the fiber-resin layer and thereby compact the reinforcing fibers and expell entrapped air and excess resin from the layer; and curing the resin while the fiber-resin layer is so compressed.

5 Claims, 7 Drawing Figures

MEANS FOR MOLDING FIBER REINFORCED COMPOSITE TUBE

This is a division of application Ser. No. 583,346, filed June 2, 1975, now U.S. Pat. No. 3,962,394.

BACKGROUND OF THE INVENTION

1. Field of the Invention

This invention relates generally to the molding art and more particularly to; and improved means for molding fiber reinforced composite tubes.

2. Prior Art

The prior art is replete with a vast assortment of techniques and equipment for molding plastics and other matrials into tubular shapes and other similar shapes. Examples of such molding techniques and equipment are described in the following U.S. Pat. Nos.:

Re. 20,460; 1,142,342; 1,146,413; 1,177,240; 1,424,386; 1,455,039; 1,457,986; 1,949,650; 2,342,988; 2,406,843; 2,999,780; 3,015,855; 3,107,158; 3,128,322; 3,377,657; 3,520,961.

The present invention is concerned with molding tubes of fiber reinforced composite materials. As is well known to those versed in the art, a fiber reinforced composite is a composite material consisting of a mass of reinforcing fibers bonded together into a rigid shape by a resin. In some cases the reinforcing fibers have a random orientation. In other cases, the reinforcing fibers may have a parallel orientation or may be arranged in several layers each having a parallel fiber orientation, with the fibers in the adjacent layers oriented in different directions to provide the fiber reinforced composite with selected mechanical and thermal expansion properties.

Such fiber reinforced composites may comprise various reinforcing fibers and various resins. The present invention is concerned primarily with molding graphite fiber reinforced epoxy tubes. It will become readily evident as the description proceeds, however, that the invention may be utilized with other fiber reinforced composites.

Simply stated, molding a fiber reinforced composite tube involves application of an annular, liquid-resin-impregnated layer of reinforcing fibers to a cylindrical mold or mandrel and curing of the resin under heat and pressure. The curing pressure expells entrapped air and excess resin from the fiber-resin layer. The curing heat converts the liquid resin to a solid resin which bonds the reinforcing fibers into a rigid mass having a tubular shape corresponding to the mandrel diameter.

The reinforcing fibers, such as graphite fibers, which are utilized in fiber reinforced composites are commercially available in strips and mats which may be impregnated with resin and wrapped around a mandrel to form the annular fiber-resin-layer on the mandrel. As noted above, the fibers may have a parallel or random orientation and may be applied to the mandrel in several layers each having a parallel fiber orientation, with the fibers in the adjacent layers oriented in different directions to attain selected mechanical and thermal expansion properties of the finished composite tube.

Molding fiber reinforced composite tubes in this manner presents a problem to which this invention is addressed. This problem resides in the fact that during the curing process, the reinforcing fibers tend to shift circumferentially of the mandrel and thereby produce wrinkles in the finished tube. As is well known by those versed in the art, such shifting of the fibers and resulting wrinkling of the finished tube may be avoided by radially compacting the fibers prior to curing.

According to one current method of compacting the fibers, a heat shrinkable tube is slid over the fiber-resin layer on the molding mandrel and is heated to shrink or constrict the tube about the layer. This contraction of the tube causes the latter to exert a radial compression force on the fiber-resin layer which compacts the fibers sufficiently to prevent their circumferential shifting during subsequent curing. After this compaction of the fibers has been accomplished, the assembly consisting of the mandrel, heat shrink tubing, and the compressed intervening fiber-resin layer is sealed in a plastic bag or bladder which is evacuated to produce an additional radial pressure on the layer and placed in an oven or autoclave to cure the resin and thereby form a rigid fiber reinforced composite tube.

While this prior method of molding a fiber reinforced composite tube produces a satisfactory finished product, it has three major limitations. One of these limitations resides in the fact that heat shrinkable tubing is available only in certain sizes which dictate the composite tube diameters which may be molded. The second limitation of the current molding procedure is that the heat shrink tubing can be used only once and then must be discarded. Considering the relatively high cost of this tubing, which is on the order of $16.00 to $60.00 per foot above 6-inch tubing diameters, it is apparent that the current molding procedure is relatively costly and adds substantially to the cost of the finished product. The third limitation of the current procedure is that the latter is limited to cylindrical tube shapes and to molding the composite about an inner mandrel, such that the surface of the finished tube which conforms to the mandrel or mold is the inner surface of the tube. Other methods of composite tube fabrication involve the use of tapered telescoping molds which are quite costly and lend themselves only to the fabrication of straight tubes, and a female mold with an internal bladder which results in a rough tube surface.

SUMMARY OF THE INVENTION

This invention provides an improved fiber reinforced composite tube molding means which avoids the above noted and other limitations of the current molding procedure described. According to the present invention, a resin-impregnated layer of reinforcing fibers is applied to a mold or mandrel, as in the current molding procedure. In contrast to the current molding procedure, however, the mandrel may be either cylindrical or rectangular in cross-section to permit molding of either cylindrical or rectangular tubes. Also, the mandrel may be either an inside mandrel whose outer surface forms the molding surface to which the fiber-resin layer is applied as in the current molding procedure or an outside mandrel female mold member in the form of a tube whose inner surface forms the molding surface to which the fiber-resin layer is applied.

In place of the heat shrinkable tubing employed in the current molding procedure to compact the reinforcing fibers in the fiber-resin layer on the molding mandrel, the present invention utilizes a longitudinally split compression sleeve which is placed in contact with the exposed surface of the fiber-resin layer, i.e. the outer surface of the layer on an inside mandrel and the inner surface of the layer on an outside mandrel. The assembly consisting of the mandrel, compression sleeve, and fiber-resin layer is then sealed in a plastic bag or bladder which is evacuated to produce a pressure on the compression sleeve. In the case of a molding operation performed on an inside mandrel, this pressure contracts the compression sleeve circumferentially about the fiber-resin layer, thereby compressing the latter between the sleeve and mandrel. In the case of a molding operation performed on an outside mandrel, the pressure on the compression sleeve expands the latter circumferentially against the fiber-resin layer, thereby compressing the latter between the sleeve and mandrel. This compression of the fiber-resin layer serves to compact its reinforcing fibers before curing, thus preventing the formation of wrinkles in the finished tube due to shifting of the fibers as explained earlier, and to provide the required pressure for curing.

According to a preferred feature of the invention, the split edges of the compression sleeve are tapered and overlap one another in such a way that the split edges are substantially flush and yet devoid of gaps therebetween. This prevents the formation of irregularities in the surface of the finished tube along the split edges, as would occur if the edges simply overlapped one another without any taper, or if the edges were spaced by an intervening gap. According to another preferred feature, the compression sleeve is perforated to permit escape of entrapped air and excess resin from the fiber-resin layer when the latter is compressed, and the compression sleeve is surrounded by an absorbent sleeve for absorbing the excess resin emerging through the compression sleeve holes. The invention permits molding of both cylindrical and rectangular tubes as well as non-linear curved and tapered tubes.

DESCRIPTION OF THE PREFERRED EMBODIMENTS

Figure 1:
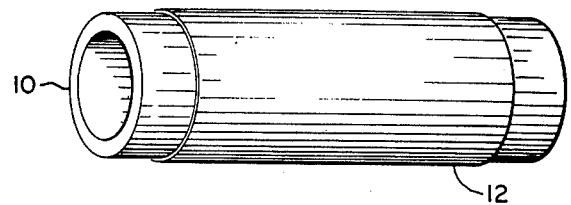
FIGS. 1 through 4 illustrate the manner in which a cylindrical fiber reinforced tube is molded in accordance with this invention using an inside mandrel.
Figure 2:
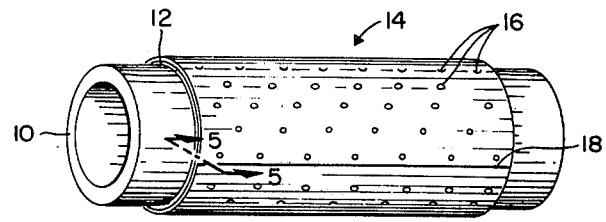

Reference is made first to FIGS. 1 through 5 illustrating the invention applied to molding a cylindrical fiber-reinforced composite tubing using an inside mandrel 10. In this case, the mandrel is a hollow cylinder of aluminum or other suitable material having an outside diameter equal to the desired inside diameter of the finished tube.

The first step of the present tube molding procedure is conventional and involves the application to the mandrel 10 of an annular, liquid-resin impregnated layer 12 of selected reinforcing fibers, such as graphite fibers. This step may be accomplished by wrapping about the mandrel one or more plies, depending upon the desired wall thickness of the finished tube, of fiber material which is commercially available in various forms such as strips, sheets, and the like, and impregnating the fiber material with the desired resin, either prior to or after application of the material to the mandrel.

Following application of the fiber-resin layer 12 to the mandrel 10, a compression sleeve 14 is placed in contact with the exposed surface of the layer. In the particular molding operation illustrated using an inside mandrel, the exposed surface of the layer is its outside surface. Accordingly, the compression sleeve is placed about the outside of the fiber-resin layer. The compression sleeve is preferably constructed of relatively thin (i.e. on the order of .015 in.) impermeable plastic film or sheet material, such as nylon or rubber, and perforated with holes 16, (i.e. on the order of .015 in.) as shown.

According to an important feature of the invention, the compression sleeve 14 is split lengthwise at 18 to accommodate circumferential contraction of the sleeve about and into pressurizing relation to the fiber-resin layer 12 to compress the layer between the sleeve and mandrel, as hereafter explained. According to another feature of the invention, the split edges 20 of the sleeve are tapered or beveled and the sleeve is so circumferentially sized relative to the fiber-resin layer 12 that when the sleeve is finally positioned about the layer, the sleeve edges 20 are disposed in the overlapping abutting relation shown in FIG. 5. As a consequence, the radially inner surfaces of the sleeve edges are flush with one another and no gap exists between the edges.

Figure 3:
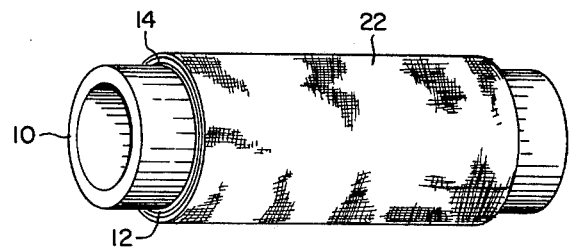
Figure 4:
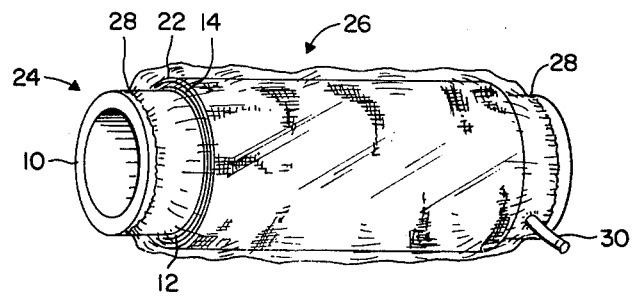
Figure 5:
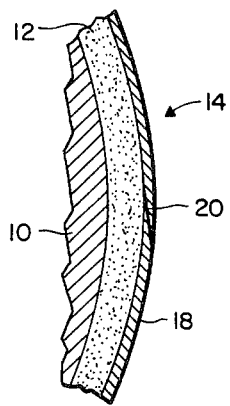
FIG. 5 is an enlarged section taken on line 5—5 in FIG. 2.

Turning to FIG. 3, a layer or sleeve 22 of absorbent material is placed about the split compression sleeve 14. This absorbent layer may comprise any porous absorbent fabric or the like, such as cotton, glass, or dacron.

In the final steps of the present tube molding method, the assembly 24, consisting of the mandrel 10, fiber-resin layer 12, compression sleeve 14, and absorbent layer 22 are sealed in a plastic bag or bladder 26 (FIG. 4) which is evaucated to effect compression of the fiber-resin layer in the manner explained below, after which the sealed and evacuated assembly is placed in an oven or autoclave to cure the resin. Thus, referring to FIG. 4, the bladder 26 surrounds the mandrel 10, resin-fiber layer 12, compression sleeve 14, and absorbent layer 22 and has its ends 28 sealed to the mandrel beyond the ends of the layers 12 and 22, and sleeve 14. The bladder carries a fitting 30 through which the bladder interior is evacuated.

When the bladder 26 is evacuated through its fitting 30, the ambient pressure on the bladder, which may be atomospheric pressure, air pressure, or hydraulic pressure, produces a radial inward force on the bladder wall which is transmitted through the wall and the absorbent layer 22 to the split compression sleeve 14. This radial force in uniform about the full circumference of the compression sleeve and causes circumferential contraction of the sleeve about and into pressurizing relation with the fiber-resin layer 12, thereby compressing the latter layer between the sleeve and the mandrel 10. In this regard, it will be understood that the split 18 in the compression sleeve 14 accommodates this contraction of the sleeve to compress the fiber-resin layer and that during contraction of the sleeve, the tapered sleeve edges 20 slide over one another. The extent of this sliding movement is relatively slight, however, so that the sleeve edges remain substantially flush with one another.

Compression of the fiber-resin layer 12 by the compression sleeve 14 serves a two-fold purpose. Thus, compression of the fiber-resin layer initially serves to compact the reinforcing fibers in the layer prior to curing. As noted earlier, this compaction of the fibers resists or prevents shifting of the fibers during curing and thereby avoids formation of wrinkles in the finished molded tube which result from such fiber shifting. Secondly, compression of the fiber-resin layer by the compression sleeve, which is continued during final curing of the resin, expells entrapped air and excess resin from the layer 12. The air and excess resin are expelled through the holes 16 in the compression sleeve, as well as from the ends of the sleeve, and the excess resin is absorbed by the absorbent layer 22. After curing of the resin, the absorbent layer and compression sleeve are removed and the finished molded tube is removed from the mandrel 10, which may be initially coated with a release compound to permit removal of the tube.

At this point, several advantages of the present tube molding method and means will be evident. First, the compression sleeve 14, and also the mandrel 10 of course, may be made in any size, thus permitting tubes of any diameter to be molded. Secondly, the compression sleeve is reusable and, at any rate, is very inexpensive to fabricate even if it is necessary to discard the sleeve after use. Thus, the present invention avoids the tube size and fabrication cost limitations, mentioned earlier, of the current composite tube molding procedure which utilizes heat shrinkable tubing. Another advantage of the invention is that it permits the molding of fiber-reinforced composite tubes having a rectangular cross-section and molding tubes using an outside mold or female mold member.

Figure 6:
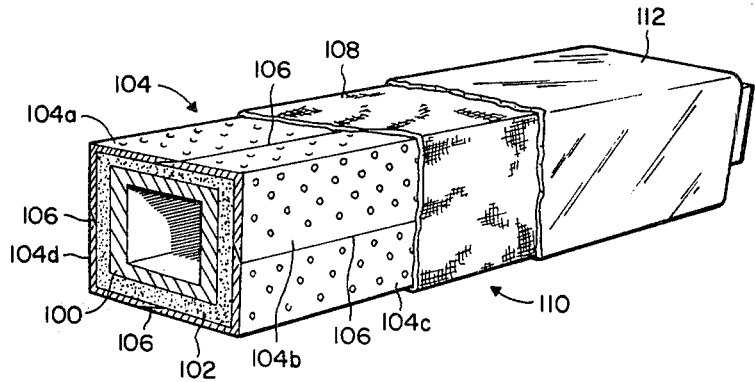
FIG. 6 illustrates the manner in which a rectangular fiber reinforced tube is molded in accordance with this invention.
Figure 7:
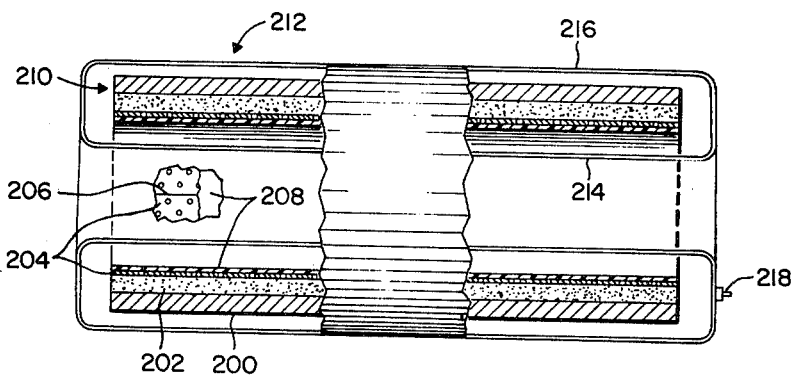
FIG. 7 illustrates the manner in which a cylindrical fiber reinforced tube is molded in accordance with this invention using an outside mandrel.

In this latter regard, attention is directed to FIG. 6 which illustrates the invention applied to molding a rectangular tube and to FIG. 7 illustrating the use of an outside mold in connection with the invention.

In FIG. 6, reference numeral 100 denotes a rectangular mandrel to which is applied a liquid-resin impregnated annular layer 102 of selected reinforcing fibers. About the layer 102 is a perforated, longitudinally split compression sleeve 104. In this case, the compression sleeve comprises four corner sections 104a, 104b, 104c, and 104d having tapered overlapping split edges 106. About the compression sleeve 104 is an absorbent layer 108. The assembly 110 consisting of the mandrel 100, fiber-resin layer 102, compression sleeve 104, and absorbent layer 108, is sealed in a plastic bag or bladder 112 which is sealed at its ends in FIG. 6 to the mandrel and provided with a fitting through which the bladder may be evacuated.

As in the application of FIGS. 1 through 5, evacuation of the bladder 112 in FIG. 6 pressurizes the compression sleeve 104 inwardly to cause circumferential contraction of the sleeve into pressurizing relation to the fiber-resin layer 102 to compress the latter between the sleeve and mandrel 100. In this case, the contacting tapered split edges 106 of the sleeve sections 104a, 104b, 104c, and 104d slide over one another to permit contraction of the sleeve. This compression of the fiber-resin layer 102 by the compression sleeve compacts the reinforcing fibers of the layer prior to curing and expells entrapped air and excess resin from the layer prior to and during curing. The excess resin emerging through the compression sleeve holes is absorbed by the absorbent layer 108.

Turning to FIG. 7, reference numeral 200 denotes a cylindrical outside or female mold member to the inner surface of which is applied an annular, liquid-resin impregnated layer 202 of fibers. Seating against the inner surface of the fiber-resin layer 202 is a perforated longitudinally split compression sleeve 204 like that in FIG. 1 through 5 and having tapered overlapping split edges 206. Within this compression sleeve is an absorbent layer or sleeve 208. The assembly 210 consisting of the mold member 200, fiber-resin layer 202, compression sleeve 204, and absorbent layer 208 is sealed in a plastic bag or bladder 212. In this case, the bladder is annular in cross-section and includes an inner wall 214 extending through the interior of the absorbent layer 208 and an outer wall 216 extending around the outside of the mold member 200. The bladder has a fitting 218 through which the bladder may be evacuated to pressurize the compression sleeve 204 radially outward against the fiber-resin layer 202, thereby compressing the layer between the sleeve and mold member to compact the reinforcing fibers of the layer prior to curing and expell entrapped air and excess resin from the layer prior to and during curing as before. The excess resin expelled through the compression sleeve holes is absorbed in the absorbent layer 208. In this application using an outside mold member, the pressure exerted on the compression sleeve 204 through the inner wall 214 of the bladder 212 expands the sleeve circumferentially into pressurizing relation to the fiber-resin layer 202. The split sleeve edges 206 slide relative to one another to permit this sleeve expansion. Obviously, the rectangular compression sleeve of FIG. 7, like the cylindrical compression sleeve of FIG. 6, may be utilized with an outside mold member. This outside mold member, of course, would be rectangular in cross-section.

I claim:

1. Means for molding a fiber reinforced composite tube comprising:
    an elongate mandrel having an annular molding surface about the longitudinal axis of the mandrel and adapted to receive an annular liquid resin impregnated layer of reinforcing fibers about said surface;
    a perforated, longitudinally split compression sleeve similar in cross-section to said mandrel having tapered overlapping edges and being in concentric relation with said mandrel with one side of said sleeve in contact with the exposed surface of a fiber-resin layer on the mandrel and operative to be urged against the layer by fluid pressure to compress the layer between the sleeve and mandrel and thereby compact the reinforcing fibers in the layer;
    an absorbent layer in contact with the other side of said sleeve; and
    a bladder for enclosing said mandrel, compression sleeve, and absorbent layer and connected to evacuating means for producing said fluid pressure on said sleeve.

2. Molding means according to claim 1 wherein:
    said mold member is a mandrel having an outer molding surface; and
    said compression sleeve is adapted to be placed concentrically about the outside of said mandrel and to be contracted circumferentially about said fiber-resin layer by fluid pressure acting on the exterior of said sleeve.

3. Molding means according to claim 1 wherein:
    said mandrel is a female mold member having an inner molding surface; and
    said compression sleeve is adapted to be placed concentrically within said female mold member and to be expanded circumferentially against said fiber-resin layer by fluid pressure acting on the interior of said sleeve.

4. Molding means according to claim 1 wherein:
said mold member and compression sleeve are annular in cross-section, and said sleeve has a single longitudinal split bounded by tapered overlapping edges, whereby the sleeve surfaces adjacent said split are flush with one another and no gap exists along said split.

5. Molding means according to claim 1 wherein: said mold member and compression sleeve are rectangular in cross-section, and said sleeve has a number of longitudinal splits dividing the sleeve into separable sections and each bounded by tapered overlapping edges, whereby the sleeve surfaces adjacent said splits are flush with one another and no gaps exist along said splits.

* * * * *